United States Patent [19]

Kneifel, II et al.

[11] Patent Number: 5,220,262

[45] Date of Patent: Jun. 15, 1993

[54] METHOD AND APPARATUS FOR REDUCING CROSS-COUPLED MOVEMENT THROUGH THE STRUCTURAL DYNAMICS OF A COMPUTER NUMERICALLY CONTROLLED MACHINE

[75] Inventors: R. William Kneifel, II; James D. Suer, both of Cincinnati; Paul A. Zaffiro, Fairfield, all of Ohio

[73] Assignee: Cincinnati Milacron, Inc., Cincinnati, Ohio

[21] Appl. No.: 841,918

[22] Filed: Feb. 25, 1992

[51] Int. Cl.$^5$ .......................... H02P 5/40; G05B 1/02
[52] U.S. Cl. ................................ 318/569; 318/600; 318/607; 318/625; 318/807; 364/474.29
[58] Field of Search ................ 318/560–636, 318/30–88, 800–807; 363/160, 163, 164; 364/474.10–474.29

[56] References Cited

U.S. PATENT DOCUMENTS

| | | | |
|---|---|---|---|
| 4,642,501 | 2/1987 | Kral et al. ................ 318/138 X |
| 4,680,695 | 7/1987 | Kerkman et al. .................. 318/807 |
| 4,697,128 | 9/1987 | Matsuhita et al. ............... 318/607 |
| 4,823,068 | 4/1989 | Delmerico et al. ............... 318/807 |
| 4,841,212 | 6/1989 | Matsushita et al. .............. 318/607 |
| 4,906,908 | 3/1990 | Papiernik et al. ................ 318/600 |
| 4,963,806 | 10/1990 | Shinohara et al. . |
| 5,005,135 | 4/1991 | Morser et al. . |
| 5,056,007 | 10/1991 | Collins, Jr. et al. ............... 364/200 |
| 5,083,074 | 1/1992 | Suzuki et al. ...................... 318/625 |

Primary Examiner—Paul Ip
Attorney, Agent, or Firm—Wood, Herron & Evans

[57] ABSTRACT

A method and apparatus are disclosed for reducing the cross-coupled movement in a member of a CNC machine caused by movement in another member of the machine through the structural dynamics of the machine. The method includes receiving the discrete position commands for a member oriented in one axis of movement for the machine, transforming the discrete position commands to attenuate frequency components that contribute to the movement coupled through the structural dynamics of the machine, and generating velocity commands from the transformed discrete position commands to control the servos that drive the members. The discrete position command transform is preferably a second order filter that implements the transfer functions of a digital notch filter and digital low pass filter. The second order filter that transforms the discrete position commands is implemented in a digital computer by state variable difference equations.

30 Claims, 4 Drawing Sheets

METHOD AND APPARATUS FOR REDUCING CROSS-COUPLED MOVEMENT THROUGH THE STRUCTURAL DYNAMICS OF A COMPUTER NUMERICALLY CONTROLLED MACHINE

FIELD OF THE INVENTION

This invention relates to computer-numerically-controlled machines and, more particularly, to computer-numerically-controlled machines for precise machining of large parts.

BACKGROUND OF THE INVENTION

Computer-numerically-controlled (CNC) machines for machining large parts with precision are well known. These machines typically include a platform to support a workpiece, a tool to machine the workpiece, and a computer for controlling the tool all mounted together such as in a frame or other structure The computer is programmed to generate position commands for tool control from a user-defined program to direct the incremental movement of the tool to machine a part from the workpiece.

To maneuver the tool for machining the part from the workpiece, the tool is mounted to movable members. Each member is oriented to move along an axis that is distinct from the axes of the other members. The computer includes several processors, one of which controls the tool maneuvers by generating discrete or digital position commands for each member from the user-defined program. A servo processor having a servo stage for each respective axis receives the discrete position commands. Each servo stage uses the position commands for its respective axis to generate velocity commands which are transmitted to a servomechanism, commonly called a servo, connected to each member by a mechanical joint such as a slide, a pivot or the like. The servomechanism drives the mechanical joint, and correspondingly, the member along its axis in accordance with the velocity command received from the servo processor to control the movement of the tool for machining the part. A CNC machine like the one described above is disclosed in U.S. Pat. No. 5,005,135 which is assigned to the assignee of the present patent application and the entire disclosure of which is hereby expressly incorporated by reference.

Because the workpiece from which the part is produced is frequently massive, the members are also heavy to provide rigidity for the tool as it cuts or bores the workpiece. These heavy members require the input of a substantial force, usually supplied by a motor within the servo, to initiate and halt their movement. Sometimes this force moves one of the members at a rate or frequency that induces movement in another member through the structural dynamics of the machine. This induced movement is called a cross-coupled response of the member through the structural dynamics of the machine. This cross-coupled response is superimposed on the driving of the member by its respective servo, and consequently, the tool. The superimposed movement may cause the tool to blemish the finish of the part which then requires hand finishing that adds substantial cost to the part.

One possible approach to this problem involves the use of a driving signal that corresponds to the drive from a servo connected to a first member to generate a correction signal for a servo that drives the member in which the cross-coupled response is induced. The correction signal may be used to counteract the cross-coupled response of the second member so the net movement change in the second member would be zero.

One problem with such an approach is that it requires a correction circuit that generates the correction signal from the driving signal derived from the servo driving the first member. Such a circuit may not only be very costly to design and implement, it may not even be feasible. Thus, it may be more desirable simply to put up with refinishing the blemished parts by hand.

Even if such a device could be implemented at a reasonable cost, coupling the correction signal generated by it to the servo driving the second member might require modification of the servo. For machines already operating in the field, such modifications may result in long down times caused by installation and testing of the correction circuit.

Another approach involves using a signal indicative of the position of the second member to generate an error signal that corresponds to a displacement distance. The displacement distance represents the error in position corresponding to the difference between the predicted position and the actual position of the member. This error signal might be used by the servo processor to generate modified discrete position commands that substantially cancel out the cross-coupled response transferred through the structural dynamics of the machine. To do this, however, the computer would have to be able to predict the response of the second member to its respective position command independent of cross-coupling errors so that the superimposed cross-coupling may be assessed and corrected. Without this predictive response capability, the computer would be unable to determine the error in the second member position. For machines already in operation, there might not be sufficient computing resources, such as processor time or memory, available to implement the predictive response capability.

Another problem in both of the aforementioned possible approaches is their potential adverse effect on the ability to coordinate tool movement between members for tool paths that require coordination between two members oriented in different axes. For example, to cut a hole, it may be necessary to move the cutting tool in small increments along two axes perpendicular to one another. In that way, the tool may be caused to move smoothly along a curved line to form a circle. If one of the approaches previously discussed were implemented then the processing of the correction signal or error signal may delay position movement in the first member. Such delay could disrupt the coordination between the first and second members causing errors in the path of the intended tool movement. Compensating for the delay in the correction circuit or the predictive response capability of the computer might require more modification to the servo or more computer resources than are available.

SUMMARY OF THE INVENTION

The present invention provides a method for controlling a CNC machine that substantially reduces the cross-coupled movement or response in a member through the structural dynamics of the machine without requiring extensive computer resources or signals generated from one axis for control of another axis. In accordance with one aspect of the invention, a transform for the discrete position commands of a first member oriented in a first axis is performed that suppresses the frequency content of the discrete position commands that excites the cross-coupled response in a second member through the structural dynamics of the machine. This transform is preferably implemented in the servo processor of the machine without requiring extensive computer resources, modifications to the servo, or position signals from any of the members.

More particularly, the present invention receives the discrete position commands for a first member oriented in a first axis, transforms them to suppress the frequency content that excites the cross-coupled response in the second member and uses the transformed commands to generate the velocity commands for the servo driving the first member. The suppression of this frequency content is accomplished by attenuating a range of frequencies about the peaking frequency of the second member response to the movement of the first member through the cross-coupled dynamics of the machine with a digital notch filter. In another aspect of the invention, the frequency content suppression is performed by attenuating frequencies in the discrete position commands for the first member above a predetermined frequency, which is preferably below the peaking frequency in the cross-coupled response of the second member, with a digital lowpass filter. Preferably, the attenuation of the discrete position commands are performed with a transform that implements both a lowpass and a notch filter combination.

Preferably, the discrete notch filter and lowpass filter combination is a second order filter for conserving computer resources, although higher order filters could be used if the processing capability is available. The second order filter of the present invention is implemented with known state variable equations. The equations are formulated to normalize the steady state gain of the filter to unity. This ensures that the attenuation of the frequency content of the discrete position commands by the filter combination does not alter the movement of the tool as commanded by the user-defined program.

To prevent disruption of the coordination between members oriented in different axes for the path movement of the tool, the transform of the present invention is performed on the discrete position commands for each member. Thus, the delay or phase shift affects each of the members substantially the same such that their respective movements remain substantially coordinated. Because the solution of the state variable equations selected to implement the second order filter combination does not require large amounts of processing resources for one member, a transform for each member may be performed in the servo processor for each respective servo stage without exceeding the processing abilities of the servo processor.

These and other objects and advantages of the present invention shall be made apparent by reference to the following description taken in conjunction with the accompanying drawings.

BRIEF DESCRIPTION OF THE DRAWINGS

The accompanying drawings, which are incorporated and constitute a part of this specification, illustrate embodiments of the invention and, together with the general description given above, and the detailed description given below, serve to explain the principles of the invention.

DETAILED DESCRIPTION OF THE INVENTION

Figure 1:
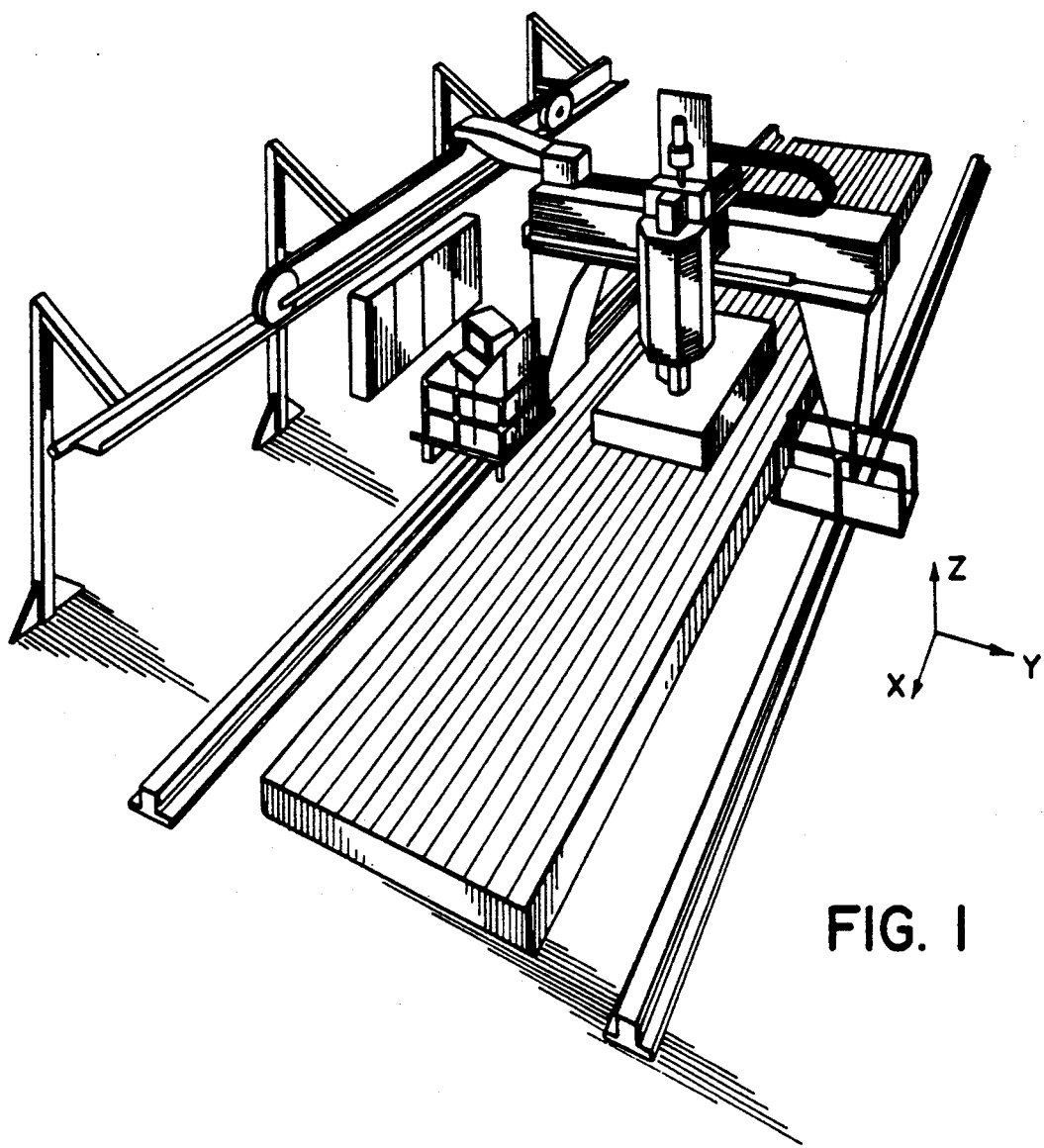
FIG. 1 is a perspective of a CNC machine incorporating the present invention.

Referring now to FIG. 1, there is shown a computer CNC machine 10 of a type to which the present invention is applicable. The machine includes a frame 12 having stationary rails 14 mounted proximate thereto. A movable member 16 is mounted on the rails 14 by mechanical joints 18 (FIG. 2), such as slides, pivots or the like, so the member 16 may move along the length of the rails 14. Other movable members, such as member 20 which bears spindle carrier housing 22 and moves along the width of member 16, move in other axes to provide a tool 24, mounted to a spindle (not shown) within spindle housing 22, a plurality of movement axes or degrees of freedom as it is also called. Three such axes are identified in the FIG. 1 as X, Y and Z.

A support platform 26 is provided between the rails 14 of FIG. 1 for stably securing a workpiece W. The mechanical joints 18 are connected to servo motors 28, such as the one shown in the FIG. 1 atop member 20, through a geared drive train or other mechanical coupling device (not shown). A controller 30 is located in the control panels 31 that ma be proximate the machine 10. The controller 30 is connected to servo amplifiers (not shown) within the control panels 31 that are coupled by a cable (not shown) to the servo motors 28. In this way, the command signals from the controller 30 are used to generate a drive current for the servo motors 28 to drive the mechanical joints 18 and their respective movable members along their respective axes to generate relative movement between the tool 24 and the workpiece W. Such CNC machines of this type are well-known in the art.

The controller 30 generates the command signals by executing a user defined program that was loaded from a program input unit or the like. The commands and parameters of the user-defined program commonly used to control the machining of a workpiece W are also disclosed in the '135 patent.

Figure 2:
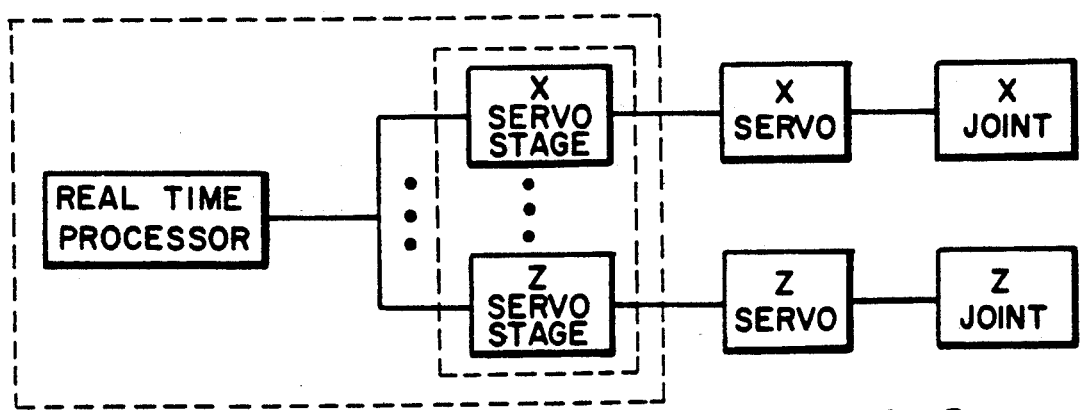
FIG. 2 is a block diagram process of the control structure implemented in the machine of FIG. 1.

A block diagram of the machine tool control structure is shown in FIG. 2. The controller 30 includes several processors of which one is a real time processor 32 and another is a servo processor 33. The servo processor 33 further includes a servo stage for each of the respective axes which are represented by the X servo stage 34 and a Z servo stage 36. Briefly, the real time processor 32 parses the user defined program to generate position command data or position commands for the respective servo stages within the servo processor 33. Each respective servo stage 34,36, for example, uses the position commands with position feedback from position indicators (not shown) located at the servo motors 28 to generate velocity commands which are transmitted to the respective servos for driving the joints 18 and their respective members oriented in the X and Z axes, respectively. Thus, the machine tool is controlled in accordance with the user defined program to machine the part from the workpiece W in a well-known manner.

Figure 3:
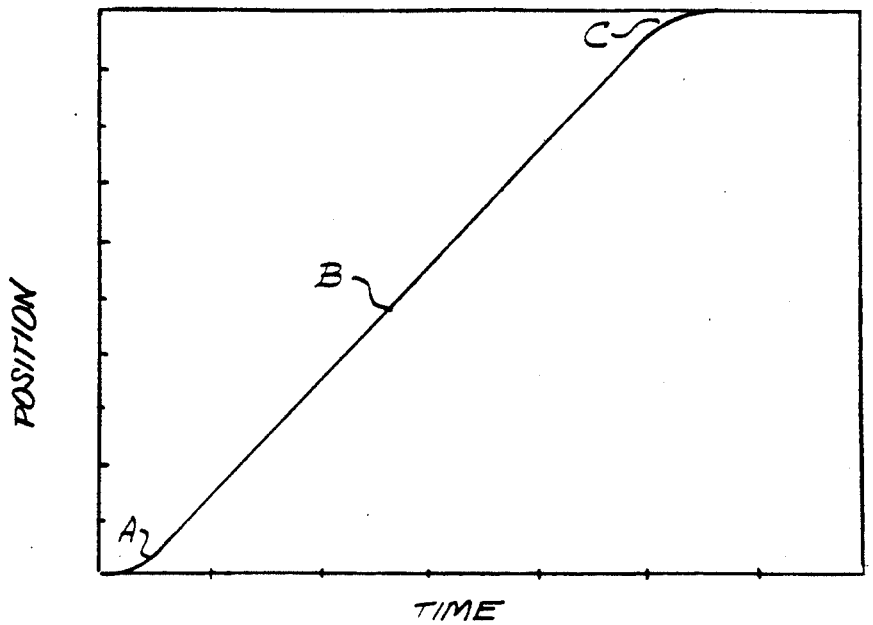
FIG. 3 is a time domain plot of a series of discrete position commands for movement of one member along its axis generated by the controller of FIG. 2.

A typical position command for the movement of a slide along one axis is shown in FIG. 3. The base of the graph reflects increasing time with respect to the origin while the ordinate axis represents increasing position magnitude with respect to the origin. While the curve of FIG. 3 is continuous with respect to time, the reader should appreciate that the digital processors within the controller 32 produce many discrete position commands that follow the shape of the curve in FIG. 3 but are not time continuous. The S-shaped curve of the position commands for a typical tool move may be divided into three segments for purposes of discussion. Segment A reflects the non-linear increasing position change to initiate movement in the member. Segment B of the curve represents a constant rate change of the position once the driven member reaches a constant speed and Segment C represents a non-linear decreasing position change to stop the member at the commanded position. Such a depiction of the position commands generated to control the movement of a member oriented in a particular axis is well known.

Figure 4:
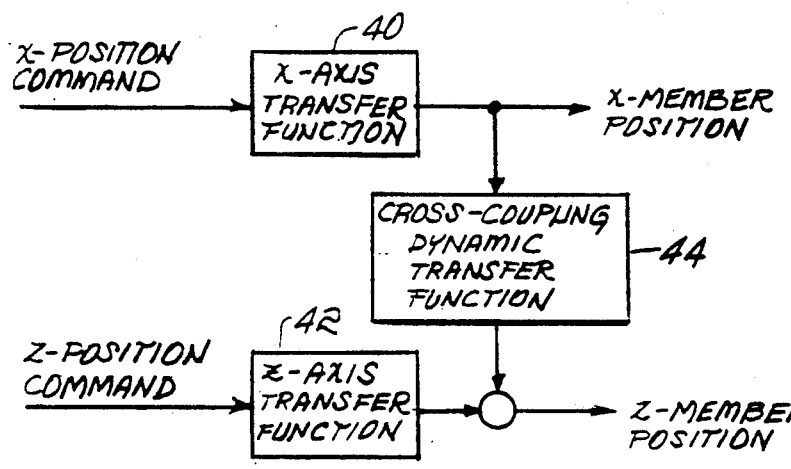
FIG. 4 is a block diagram depicting the transfer functions of a machine having cross-coupled response in one member through the structural dynamics of the machine.

A block diagram showing the interrelationships of the various position commands to the responses in the X and Z members of the machine 10 is shown in FIG. 4. In FIG. 4, the discrete position commands for the X and Z axes result in X and Z member position responses, respectively. The relationship of the X position command to the X member position response may be represented by an X axis transfer function 40, as is well known in the art. Similarly, the Z position command and Z member position response relationship may be represented by a Z axis transfer function 42. Because movement in the X member is transmitted through the structural dynamics of the machine there is also a relationship between the X member position response and the Z member position response which can be represented by a cross-coupling structural dynamic transfer function 44. The output of the transfer function 44 is superimposed on the Z member position response to Z axis position commands and may produce part blemishes. Since the X position response is related to the X position command, the two transfer functions 40 and 44 may be mathematically combined to represent the relationship of the Z member position response to the X position commands.

Figure 5:
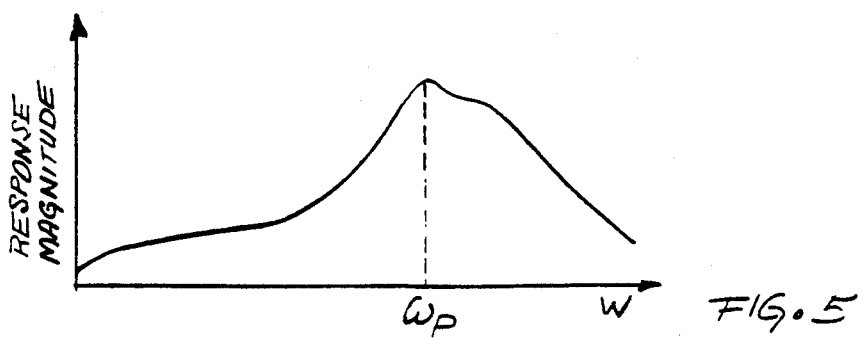
FIG. 5 is a magnitude plot of the response in the Z member position to the X position command.

A graph of a magnitude plot of the frequency content of the transfer function of the Z member position response to the X position command is shown in FIG. 5. Looking at the FIG. 5, the reader can see that the magnitude of the Z member position response to the X position command is small for low frequencies, then increases to a peak magnitude at a frequency wp before falling off to a lower magnitude at higher frequencies. If the magnitude of the Z member position response to the X position command could be reduced in the vicinity of the wp frequency then the contribution of the cross-coupled response through structural dynamics to the Z member response would also be reduced.

A novel method for reducing the magnitude of the frequency content of the Z member response to the X position commands in the vicinity of the frequency wp is achieved by transforming the X position commands prior to the X position commands being used to generate velocity commands for the servo amplifiers of the machine 10. This method utilizes the control structure already implemented in the machine 10 without exceeding the processing resources of the servo processor 32. Thus, by altering the operation of the servo stage 34 for the X axis, the Z member position response may be better controlled to substantially reduce blemishes in the finished part caused by cross-coupled movement through the structural dynamics of the machine 10.

Figure 6:
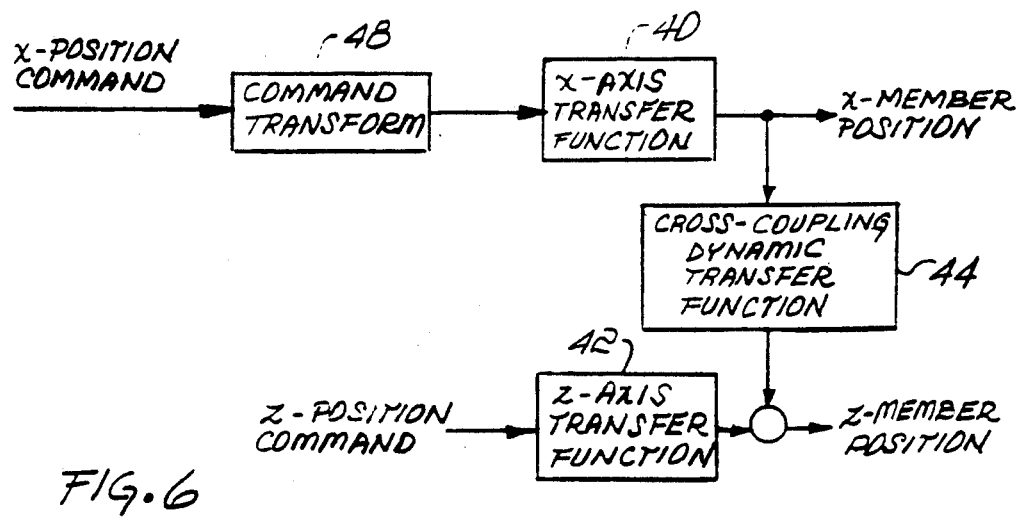
FIG. 6 is a block diagram depicting a command transform of the present invention to reduce the response in the Z member through the structural dynamics transfer function of the machine depicted in FIG. 4.

A block diagram of a system incorporating the inventive method is shown in FIG. 6. FIG. 6 is like FIG. 4 except the position commands received from the controller 32 are transformed by a command transform implemented in the X axis servo stage 34 (FIG. 2). The transformed position commands drive the X axis transfer function 40 with negligible change in the response of the X member position while substantially reducing the Z member position response that causes the blemish problem.

In one aspect of the invention, a digital notch filter is implemented using state variable difference equations to transform the X position commands. Transfer functions that represent the relationship of the output to the input of a notch filter are well-known. Preferably, a second order notch filter is implemented in the present invention, although higher order filters may be used. An equation representing a second order notch filter in the frequency domain is:

$$K \frac{(jw)^2 + 2\zeta w_n(jw) + w_n^2}{(jw + a)^2} \quad (1)$$

where j is the square root of $-1$, w is the input frequency in rad/second, $W_n$ is the natural frequency of the notch filter, $\zeta$ is a dimensionless damping coefficient, and a is a real pole, of which there are two since $(jw+a)$ is squared. The roots of the numerator are known as the zeros of the transfer function and define the notch frequency about which a range of frequencies are substantially attenuated.

Figure 7:
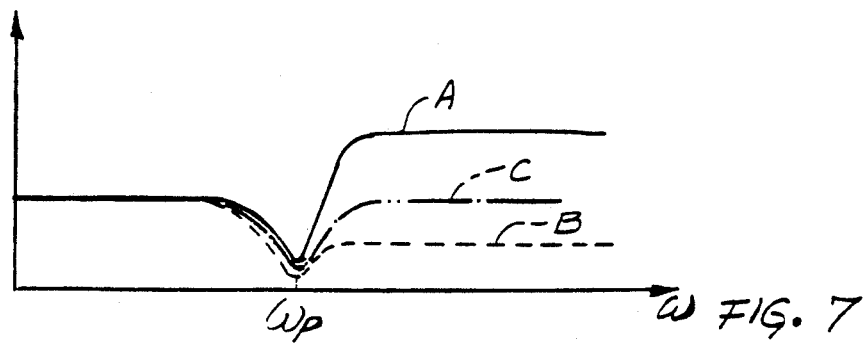
FIG. 7 is a magnitude plot of three filter transfer functions of the present invention.

The magnitude of the frequency content of the relationship of the output to the input of a notch filter represented by Equation 1 may be plotted as shown in the three curves of FIG. 7. The solid line curve A represents a second order notch filter having its real poles realized at a frequency above the peaking frequency wp. The dashed line curve B represents a second order notch filter having its real poles realized at a frequency below the peaking frequency wp and the dotted line curve C represents a second order notch filter having its real poles realized at a frequency at or near the peaking frequency wp. Curve A shows the notch filter does not reduce the magnitude of the frequency content at the lower frequencies, substantially reduces it at the notch frequency of the filter, and amplifies it at the higher frequencies. The notch filter of Curve B passes the lower frequency components with little change and attenuates the frequency components at the higher frequencies. The filter of Curve C has little effect on the magnitude of the frequency components except for a small range, or bandwidth, centered about the notch frequency of the filter.

Figure 8:
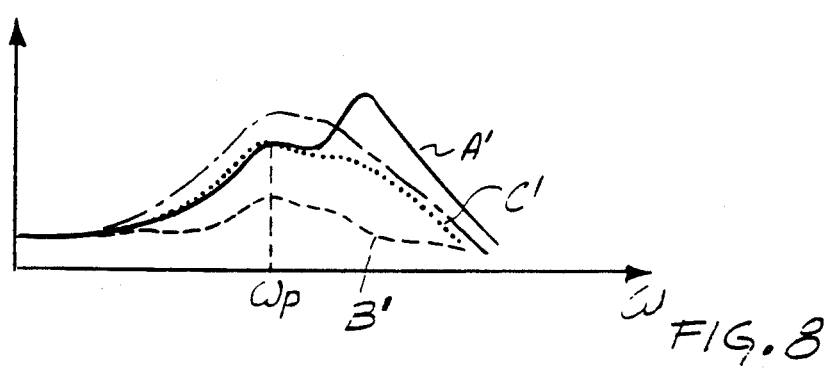
FIG. 8 is a magnitude plot of the response in the Z member position to the X position commands after they are transformed by the filter transfer functions of FIG. 7.

The effect of each of the filters shown in FIG. 7 on the magnitude of the frequency content of the Z member position response to the X position command is shown in FIG. 8. The magnitude response depicted in FIG. 5 is shown for comparison purposes. All three show a reduced magnitude for the bandwidth at the peak frequency wp and substantially the same effect on the frequency components below the bandwidth of the notch frequency. The filter represented by Curve A amplifies the magnitude of the higher frequency components (Curve A') while the filter represented by Curve B attenuates the magnitude of the higher frequency components (Curve B'). There are trade-offs associated with the effect of the filters of Curves A and B on these higher frequency components which must be considered for the machine in which the cross-coupling response is being reduced. Specifically, amplifying the high frequency components of the X position commands with the notch filter of Curve A increases the magnitude of the high frequency components of transient response of the X member to X position commands. This may be objectionable if these higher frequency components excite additional structural dynamics in the X axis.

The filter represented by Curve B passes without unalteration the magnitude of the lower frequency content and attenuates the magnitude of the higher frequency content in the X position command. By selecting real pole values in the appropriate portion of the lower frequency range, the frequency content of the X position commands which excite little or no response in the Z member are passed unaltered while the notch filter substantially reduces the X position frequency content that excites the Z member response in the bandwidth range centered about the peak frequency wp. Since the poles are in the low frequency range, the higher frequency content of the X position command is attenuated which corresponds to a reduction in the magnitude of the higher frequency content in the Z member response. Preferably, setting the pole for the denominator of equation (1) equal to a value of 20–40 rad/sec produces a graph of the Z member position response to X position command like Curve B' in FIG. 8. Note the lack of amplification of the higher frequency content and the attenuation of the frequency in the bandwidth range at the notch frequency reduces the Z member position response to the X position command so the cross-coupled movement is reduced further than that noted with the notch filter represented by Curve A. However, selecting the pole values to be in the lower frequency range introduces a phase shift in the X position command which introduces a phase shifter in the response of the X member position. This phase shift disrupts the coordination of movement between the X member position and the Z member position. A solution for re-coordinating the position responses of the X and Z members for the implementation of the notch filter represented by Curve B is discussed in more detail below.

Alternatively, the real poles for the denominator of equation (1) could be set to a value that corresponds to a frequency within the bandwidth range at notch frequency to produce a filter transfer function represented by the Curve C in FIG. 7. Such pole selection does not attenuate nor amplify the X position command frequency content in the frequency range above or below the notch frequency and does not reduce the cross-coupled movement in the Z member sufficiently for most applications.

Figure 9:
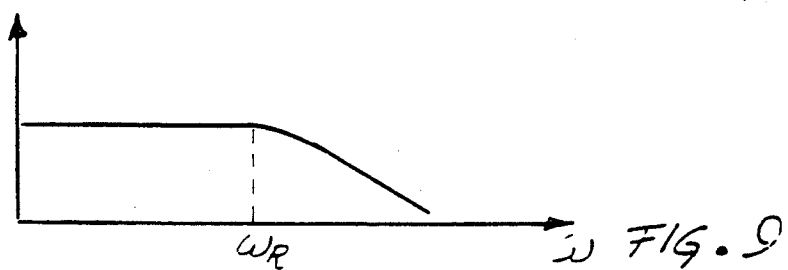
FIG. 9 is a magnitude plot of a lowpass filter transfer junction in another aspect of the present invention.
Figure 10:
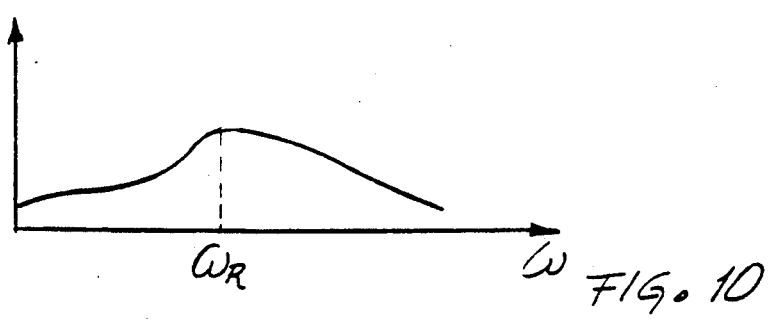
FIG. 10 is a magnitude plot of the response in the Z member position to the X position commands after they are transformed by the filter transfer function of FIG. 9.

Alternatively, another filter that could be used to transform the X position commands to attenuate the magnitude of the Z member position responses to the X position commands is a low pass filter. The transfer function of a low pass filter is shown in FIG. 9. Using this function to transform the X position commands produces the magnitude of the Z member position response to the X position command shown in FIG. 10. Note that from the origin out to a roll-off frequency WR, the contribution of the lower frequency components remains unchanged over that shown in FIG. 5. At frequencies above the roll-off frequency WR, the low pass filter attenuates the frequency components causing the magnitude of the higher frequency components to decrease. Thus, the attenuated discrete position command contains less of the frequency components that excite cross-coupled movement in the Z member as shown in the magnitude plot of FIG. 5.

While the low pass transform of FIG. 9 reduces the cross-coupled movement in the Z member, it also removes most of the contribution of the higher frequency components in the discrete position command. These higher frequency components contribute to a quicker transient response in the driving of the first member by its servo stage. In many applications, this degradation in the transient response can be ignored. It should be apparent to one of ordinary skill in the art that the low pass filter is a special case of the filter represented by Curve B above where the zeros are selected so the notch filter region is located at a much higher frequency and the poles are located in the low frequency range below the peaking frequency wp.

The Z plane poles that are obtained by mapping the S plane poles to the real-imaginary plane using the transformation $Z = \exp(sT)$ where exp is the exponential function, $s = \text{sigma} + jw$ where sigma is the real component and $jw$ is the complex component in the S-plane, and T is the sampling period for the discrete position commands, are of the form:

$$Z_\eta = e^{-aT} \qquad (2)$$

where a is the pole frequency of Equation (1) in rad/sec.

The zeros for the numerator of Equation (1) are of the form:

$$s = -\zeta w_n \pm jw_n \sqrt{1 - \zeta^2} \qquad (3)$$

where $\zeta$ is a dimensionless factor called a damping ratio and $W_\eta$ is the notch frequency of the notch filter. Mapping the S-plane zeros of equation (1) to the Z-plane produces:

$$z_{1,2} = e^{(-\zeta w_n + jw_n \sqrt{1-\zeta^2})T}, e^{(-\zeta w_n + jw_n \sqrt{1-\zeta^2})T} \qquad (4)$$

Substituting Equations 2 and 4 into Equation 1 produces a Z transform function for the combined filter transfer function of $$K \frac{z^2 - (2e^{-\zeta w_n T}\cos(w_n T\sqrt{1-\zeta^2}))z + e^{-2\zeta w_n T\sqrt{1-\zeta^2}}}{z^2 - (2e^{-aT})z + e^{-2aT}} \quad (5)$$

where K is a gain factor. The derivation of this Z transfer function is well known by one of ordinary skill in the control theory art.

Using the known relationship that Z is equal to 1 in the Z-plane when jw is equal to 0 in the S-plane, the value of the gain factor K in Equation (5) that normalizes the Z transform filter transfer function can be solved to yield:

$$\frac{(1 - e^{-aT})^2}{(1 - e^{(-\zeta w_n + jw_n\sqrt{1-\zeta^2})T})(1 - e^{(-\zeta w_n - jw_n\sqrt{1-\zeta^2})T})} \quad (6)$$

Simplifying the transfer function of the notch and low pass filter fraction given by Equation 5 with the use of the trigonometric identity:

$$\cos(w_n T\sqrt{1-\zeta^2}) = \frac{1}{2}(e^{jw_n T\sqrt{1-\zeta^2}} + e^{-jw_n T\sqrt{1-\zeta^2}})$$

produces a Z transform transfer function of:

$$K \frac{(z - e^{(-\zeta w_n + jw_n\sqrt{1-\zeta^2})T})(z - e^{(-\zeta w_n - jw_n\sqrt{1-\zeta^2})T})}{(z - e^{-aT})^2} \quad (7)$$

where $$K = \frac{1 - 2e^{-aT} + e^{-2aT}}{1 - 2e^{-\zeta w_n T}\cos(w_n T\sqrt{1-\zeta^2}) + e^{-2\zeta w_n T\sqrt{1-\zeta^2}}} \quad (8)$$

A set of difference equations that implement the Z transform transfer function may be expressed in state variable form as:

$$x_{n+1} = \begin{bmatrix} 0 & 1 \\ -a_2 & -a_1 \end{bmatrix} x_n + \begin{bmatrix} 0 \\ K \end{bmatrix} u_n \quad (9)$$

where $X_{n+1}$ is the next state vector of the transfer function, a2 and a1 are coefficients of the difference equations, K is a digital approximation of equation (8) using known digital computational techniques, and $u_n$ is a forcing function which in the CNC machine is the current discrete position command. The coefficients a1 and a2 are, respectively:

$$a1 = -2\exp(-aT) : a2 = \exp(-2aT) \quad (10)$$

As is well known, the output equation for a variable state equation having the form of equation (10) is given by:

$$pos\_cmd = C_1 x_1 + C_2 X_2 + Kcmd \quad (11)$$

where $$c1 = b2 - a2 = e^{-2\zeta w_n T} - e^{-2aT} \quad (12)$$

$$c2 = b1 - a1 = -2e^{-\zeta w_n T}\cos(w_n T\sqrt{1-\zeta^2}) + 2e^{-aT} \quad (13)$$

$$b1 = -2e^{-\zeta w_n T}\cos(\omega_n T\sqrt{1-\zeta^2}) \quad (14)$$

$$b2 = e^{-2\zeta w_n T} \quad (15)$$

cmd is the discrete position command and K is the normalizing gain factor of equation (8). The coefficients b1 and b2 correlate to the coefficients in the numerator of the transfer function polynominal in Z of equation (7) and xn is the current state of the transfer function in Z. Pos_cmd is the output of the state equation which is the filtered or transformed command.

The state variables x1 and x2 in equation (9) are updated each time a new discrete position command is formed by the equations:

$$nx1 = x2 \quad (16)$$

$$nx2 = -a2*x1 - a1*x2 + k*cmd \quad (17)$$

$$x1 = nx1 \quad (18)$$

$$x2 = nx2 \quad (19)$$

The equations (16)–(19) show that the next position command generated by equation (11) is formed from previous state responses of the filter state equations operating on previous discrete position commands. Thus, the filter is a recursive or infinite impulse response (IIR) filter since prior states are used to generate the current state.

Figure 11:
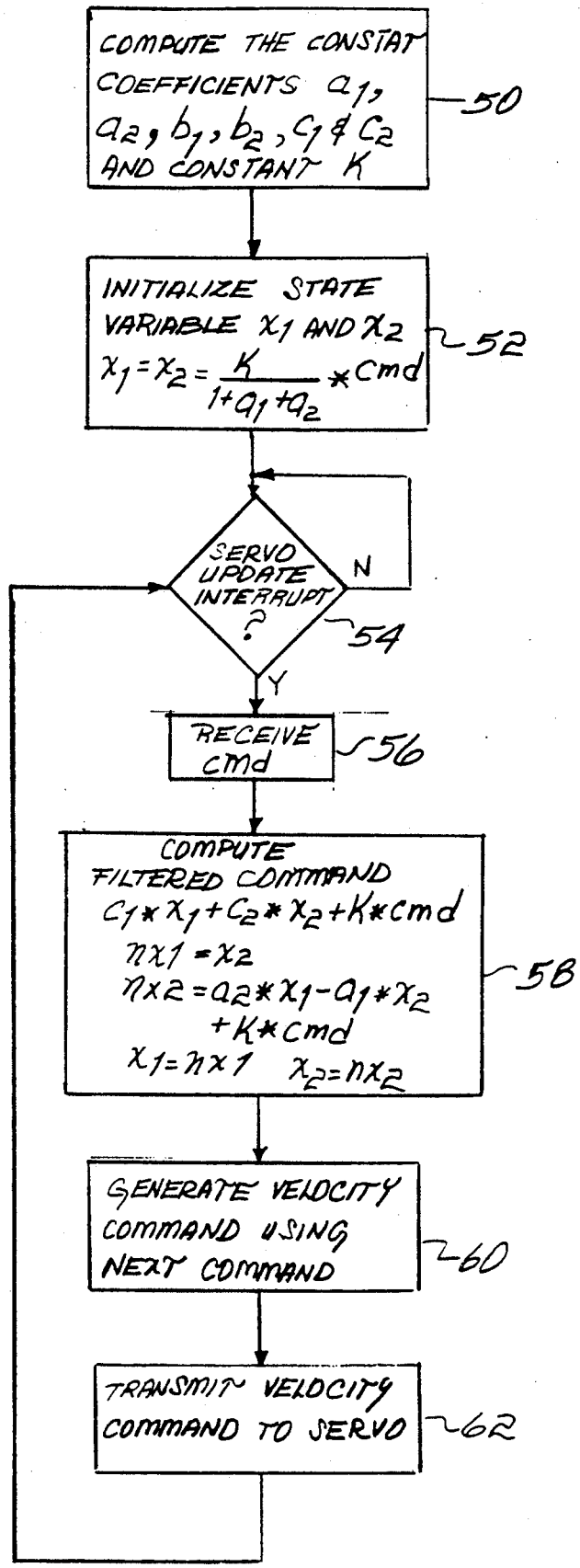
FIG. 11 is a flow chart of a program that implements the preferred filter transfer function of FIG. 7.

A flowchart for a program to implement the method of the present invention that is executed in the servo processor for a particular axis is shown in FIG. 11. The constant coefficients a1, a2, b1b2, c1, c2, and K are first computed as shown in block 52. Coefficients a1 and a2 are computed from equation (10), coefficient b1 and b2 are computed from equations (12) and (13), and coefficients c1 and c2 are computed from equations (14) and (15). Also at initiation of the program execution, the state variables x1 and x2 are initialized by using the initialization equations in block 50 where K is defined by equation (8). These initialization equations are formed by solving equation (9) at steady state which yields:

$$x1 = x2 = (K*cmd)/(1 + a1 + a2) \quad (20)$$

where x1 and x2 are the state variables, a1 and a2 are the coefficients from equation (10), K is the normalizing constant for unity gain, and cmd is the initial discrete position command. Computing the initial values for x1 and x2 ensures that the state variables correspond to the first received position command without oscillation so the member does not oscillate while each servo stage reaches a steady state condition.

When a servo update interrupt is received which corresponds to the sampling period, the program receives a position command for a particular axis, blocks 54 and 56. The received command is transformed by equation (11) as shown in block 58. The next state and current state variables are also updated as indicated in the block 58. The transformed position command along with position feedback is used to generate a velocity command, block 60, that is transmitted to the servo, block 62, for driving the member associated with the particular axis controlled by its respective servo stage. At the next servo update interrupt, the position command transform loop, blocks 56-62, is executed again. Preferably, the computations are performed with double word floating point precision to maintain the resolution of the discrete position commands for driving the members over a 200' length in increments of 0.0001".

While the transforms previously discussed may be implemented on the servo stage of only one member if the members are independently moved, such is rarely the case in typical CNC machines. Instead, the tool is frequently is moved in paths that require the substantially simultaneous movement of two members in their respective axis. If the discrete position commands to one of the members is transformed using one of the above filter transfer functions and the discrete position commands to the other member are not so transformed, then a phase shift or lag occurs in the movement of the filtered member controlled by the transformed or filter commands. This phase shift disrupts the coordination between the two members and the actual tool path differs from the commanded tool path. Such a phenomenon is not surprising since it is well-known that the filtering of a signal introduces a shift of angle theta in the phase relationship of the filtered signal to the unfiltered signal. Thus, if the discrete position commands for only one member are transformed then the response of the member controlled by the transformed commands lags the response of the other member by angle theta. This disruption of the coordination was noted with respect to the filter transfer function represented by Curve B in FIG. 7.

Preferably, the coordination of the movement between the members is restored by filtering the discrete commands for all of the servo stages in the servo processor in the same manner. By so filtering all of the position commands to the servo stages, the same phase shift is introduced into the response of all the members. Thus, the coordination between the members is restored. Because the implementation of the preferred transform function may be computed by using linear state variable equations (9) through (19) as discussed above, the additional computational load in performing the transform in the other servo stages is tolerable.

While the present invention has been illustrated by the description of the preferred and alternative embodiments and while the embodiments have been described in considerable detail, it is not the intention of the applicants to restrict or any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed is:

1. A method for reducing a cross-coupled response through the structural dynamics of a computer-numerically-controlled machine from a first member in one axis to a second member in another axis, comprising:

receiving discrete position commands for the first member of the computer-numerically-controlled machine;

transforming the discrete position commands to prevent movement of the first member at a frequency that couples movement from the first member to the second member through the structural dynamics of the computer-numerically-controlled machine; and generating velocity commands from the transformed position commands for output to a servo to control movement of the first member so that cross-coupled movement of the second member through the structural dynamics of the machine is reduced.

2. The method of claim 1, said transforming step further comprising:

attenuating filter components in the discrete position commands that are within a range of frequencies centered about a peaking frequency of the structural dynamics that couples movement to the second member.

3. The method of claim 1, said transforming step further comprising:

attenuating filter components in the discrete position commands that are above a predetermined frequency.

4. The method of claim 2, said attenuating step further comprising:

performing a digital notch filter transformation of the discrete position commands.

5. The method of claim 3, said attenuating step further comprising:

performing a digital lowpass filter transformation of the discrete position commands.

6. The method of claim 1, said transforming step further comprising:

attenuating frequency components in the discrete position commands that are within a range of frequencies centered about a frequency; and attenuating frequency components in the discrete position commands that are above a predetermined frequency.

7. The method of claim 6 further comprising:

implementing a second order filter having a transfer function of the form:

$$K = \frac{(jw)^2 + 2\zeta w_n(jw) + w_n^2}{(jw + a)^2}$$

where j is $\sqrt{-1}$, $\zeta$ is a dimensionless damping ratio, T is a sampling period and $w_n$ is a natural frequency of the filter.

8. The method of claim 7 further comprising:

setting $w_n$ to a frequency that corresponds to the peaking frequency of the structural dynamics that couples movement to the second member; and setting the pole of the denominator to a frequency that is below the peaking frequency.

9. The method of claim 7 further comprising:

setting $w_n$ to a frequency that corresponds to the peaking frequency of the structural dynamics that couples movement to the second member; and setting the pole of the denominator to a frequency that is above the peaking frequency.

10. The method of claim 7 further comprising:

setting $w_\eta$ to a frequency that corresponds to the peaking frequency of the structural dynamics that couples movement to the second member; and setting the pole of the denominator to a frequency that is approximately equal to the peaking frequency.

11. The method of claim 7 further comprising:

setting $w_\eta$ to a frequency substantially above the peaking frequency of the structural dynamics that couples movement to the second member; and setting the pole of the denominator to a frequency that is below the peaking frequency.

12. The method of claim 7, said transforming step further comprising:

calculating a gain K according to the formula:

$$\frac{(1-e^{-aT})^2}{(1-e^{(-\zeta w_n+jw_n\sqrt{1-\zeta^2})T})(1-e^{(-w_n-jw_n\sqrt{1-\zeta^2})T})}$$

calculating a first coefficient according to the formula:

$$c_1 = e^{-2\zeta\omega T} - e^{-2aT}$$

calculating a second coefficient according to the formula:

$$c_2 = -2e^{-\zeta w_n T}\cos(w_n T\sqrt{1-\zeta^2}) + 2e^{-aT}$$

generating a modified position command according to the formula:

$$pos\_cmd = c_1 x_1 + c_2 x_2 Kcmd$$

where x1 is a first prior state variable, x2 is a second prior state variable, and cmd is the received discrete position command;

updating a first next state nx1 to the second prior state variable x2;

calculating a second next state nx2 according to the formula:

$$nx_2 = -a_2 x_1 - a_1 x_2 + Kcmd$$

where $a1 = -2\exp(-aT)$ and $a2 = \exp(-2aT)$ and a is a real pole value in rad/sec and T is a sampling period;

updating the first prior state x1 to the first next state nx1; and updating the second prior state x2 to the second next state nx2.

13. The method of claim 12 further comprising:

initializing first prior state variable x1 and second prior state variable x2 to a initial value according to the formula:

$$x1 = x2 = (K * cmd)/(1+a1+a2)$$

where $a1 = -2\exp(-aT)$, $a2 = \exp(-2aT)$, a is a real pole in rad/sec, T is a sampling period, cmd is the received discrete position command, and K is the normalizing gain factor.

14. The method of claim 1 further comprising:

receiving discrete position commands for a second member of the computer-numerically-controlled machine;

transforming the discrete position commands for the second member;

generating a velocity command from the transformed position command for the second member for output to a servo to control movement of the second member so that a phase shift is introduced into the movement of the second member whereby substantial coordination between movement of the first and the second member is restored.

15. The method of claim 14, said transforming step for the position commands of the second member further comprising:

transforming the position commands for the second member in substantially the same manner as the transforming step for the position commands for the first member.

16. A device for reducing a cross-coupled response through the structural dynamics of a computer-numerically-controlled machine from a first member in one axis to a second member in another axis, comprising:

means for receiving discrete position commands for the first member of the computer-numerically-controlled machine;

means for transforming the discrete position commands to prevent movement of the first member at a frequency that couples movement from the first member to the second member through the structural dynamics of the computer-numerically-controlled machine; and means for generating velocity commands from the transformed position commands for output to a servo to control movement of the first member so that cross-coupled movement of the second member through the structural dynamics of the machine is reduced.

17. The device of claim 16, said transforming means further comprising:

means for attenuating filter components in the discrete position commands that are within a range of frequencies centered about a peaking frequency of the structural dynamics that couples movement to the second member.

18. The device of claim 16, said transforming means further comprising:

means for attenuating filter components in the discrete position commands that are above a predetermined frequency.

19. The device of claim 17, said attenuating means further comprising:

means for performing a digital notch filter transformation of the discrete position commands.

20. The device of claim 18, said attenuating means further comprising:

means for performing a digital lowpass filter transformation of the discrete position commands.

21. The device of claim 16, said transforming means further comprising:

means for attenuating frequency components in the discrete position commands that are within a range of frequencies centered about a frequency; and means for attenuating frequency components in the discrete position commands that are above a predetermined frequency.

22. The device of claim 21 further comprising:

means for implementing a second order filter having a transfer function of the form:

$$K\frac{(z - e^{(-\zeta w_n + jw_n\sqrt{1-\zeta^2})T})(z - e^{(-\zeta w_n - jw_n\sqrt{1-\zeta^2})T})}{(z - e^{-aT})^2}$$

where j is $\sqrt{-1}$, $(Z-e^{-at})^2$ dimensionless damping ratio, T is a sampling period and w is a natural frequency of the filter.

23. The device of claim 22 further comprising:
    means for setting $w_\eta$ to a frequency that corresponds to the peaking frequency of the structural dynamics that couples movement to the second member; and
    means for setting the pole of the denominator to a frequency that is below the w frequency.

24. The device of claim 22 further comprising:
    means for setting $w_\eta$ to a frequency that corresponds to the peaking frequency of the structural dynamics that couples movement to the second member; and
    means for setting the pole of the denominator to a frequency that is above the peaking frequency.

25. The device of claim 22 further comprising:
    means for setting $w_\eta$ to a frequency that corresponds to the peaking frequency of the structural dynamics that couples movement to the second member; and
    means for setting the pole of the denominator to a frequency that is approximately equal to the peaking frequency.

26. The device of claim 22 further comprising:
    means for setting $w_\eta$ to a frequency substantially above the peaking frequency of the structural dynamics that couples movement to the second member; and
    means for setting the pole of the denominator to a frequency that is below the peaking frequency.

27. The device of claim 22, said transforming further comprising:
    means for calculating a gain K according to the formula:

$$K = \frac{1 - 2e^{-aT} + e^{-2aT}}{1 - 2e^{-\zeta w_n T}\cos(w_n T\sqrt{1-\zeta^2}) + e^{-2\zeta w_n T\sqrt{1-\zeta^2}}}$$

means for calculating a first coefficient according to the formula:

$$c_1 = e^{-2\zeta T} - e^{-2aT}$$

means for calculating a second coefficient according to the formula:

$$c_2 = -2e^{-\zeta w_n T}\cos(w_n T\sqrt{1-\zeta^2}) + 2e^{-aT}$$

means for generating a modified position command according to the formula:

$$pos\_cmd = c_1 x_1 + c_2 x_2 + Kcmd$$

where x1 is first prior state variable x2 is second prior state variable, and cmd is the received discrete position command;
    means for updating a first next state nx1 to the second prior state variable x2;
    means for calculating a second next state nx2 according to the formula:

$$nx_2 = -a_2 x_1 - a_1 x_2 + Kcmd$$

where $a1 = -2\exp(-aT)$ and $a2 = \exp(-2aT)$ and a is a real pole value in rad/sec and T is a sampling period;
    means for updating the first prior state x1 to the first next state nx1; and
    means for updating the second prior state x2 to the second next state nx2.

28. The device of claim 27 further comprising:
    means for initializing first prior state variable x1 and second prior state variable x2 to a initial value according to the formula:

$$x1 = x2 = (K * cmd)/(1 + a1 + a2)$$

where $a1 = -2\exp(-aT)$, $a2 = \exp(-2aT)$, a is a real pole in rad/sec, T is a sampling period, cmd is the received discrete position command, and K is the normalizing gain factor.

29. The device of claim 16 further comprising:
    means for receiving discrete position commands for a second member of the computer-numerically-controlled machine;
    means for transforming the discrete position commands for the second member;
    means for generating a velocity command from the transformed position command for the second member for output to a servo to control movement of the second member so that a phase shift is introduced into the movement of the second member whereby substantial coordination between movement of the first and the second member is restored.

30. The device of claim 29, said transforming means for the position commands of the second member further comprising:
    means for transforming the position commands for the second member in substantially the same manner as the transforming step for the position commands for the first member.

* * * * *